Jan. 17, 1950     A. W. MESICK     2,495,016
SELF-LOCKING AND UNLOCKING DIFFERENTIAL GEAR SYSTEM

Filed Nov. 12, 1947

INVENTOR.
Albert W. Mesick,
BY
Attorney

Patented Jan. 17, 1950

2,495,016

UNITED STATES PATENT OFFICE 2,495,016

SELF-LOCKING AND UNLOCKING
DIFFERENTIAL GEAR SYSTEM

Albert W. Mesick, Brooklyn, N. Y.

Application November 12, 1947, Serial No. 785,215

2 Claims. (Cl. 74—710.5)

This invention relates to differential gearing operative to transmit power from a common source to independent driven elements, such e. g. as the traction wheels of an automobile.

The invention has for an object to provide a differential gearing which will normally transmit power to independent elements driven thereby with required differential effect, but which includes novel means operative, under certain conditions, to automatically lock the gearing whereby to cause the same to drive said independent elements as a unit, and operative, under other conditions, to automatically unlock the gearing for resumption of differential driving effect.

Other objects of this invention, not at this time more particularly enumerated, will be understood from the following detailed description of the same.

Illustrative embodiments of the invention are shown in the accompanying drawings, in which.

Similar characters of reference are employed in the above described views, to indicate corresponding parts.

Figure 1:
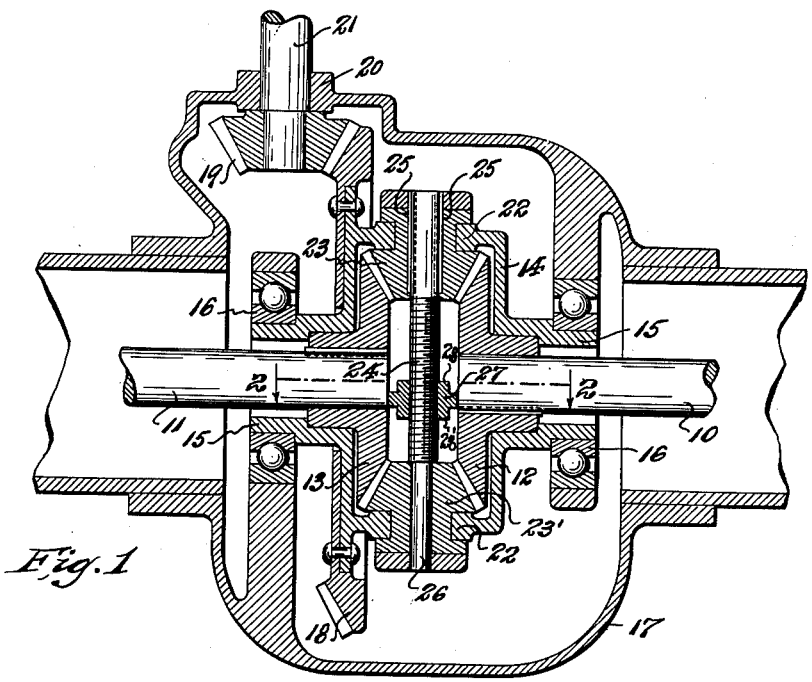
Fig. 1 is a horizontal sectional view through differential gearing made according to the invention.

Referring to the drawings, the differential gear mechanism comprises the usual oppositely extending driven shafts 10 and 11 which respectively serve the respective elements, such e. g. as the traction wheels of an automobile, which are desired to be normally independently driven. Fixed respectively on the opposed inner ends of said driven shafts 10 and 11 are bevel gear wheels 12 and 13. Rotatable about the hubs of said bevel gear wheels 12 and 13 is a member or frame 14. Said rotatable member or frame 14 is provided with journal extensions 15 which rotate in bearings 16, the latter being supported by and within a housing 17 by which the differential gearing mechanism is enclosed. Fixed on said member or frame 14, so as to be unitary therewith, is a bull gear wheel 18 by which the member or frame is rotated. Said bull gear wheel is, in turn, driven by a drive pinion 19 which is supported by a bearing portion 20 with which the housing 17 is furnished. The drive pinion 19 is fixed on a power transmission or drive shaft 21. Journaled in bearing portions 22, with which the rotatable member or frame 14 is provided, so as to rotate freely therein, are planetary pinions 23 and 23'. Said planetary pinions are disposed between the opposed bevel gear wheels 12 and 13 so as to mesh therewith. The pinions 23—23' act as keys between the rotating member or frame 14 and the bevel gear wheels 12 and 13, whereby to transmit the rotary movement of said member or frame 14 to the latter, and yet, by reason of the free rotation of the pinions, normally transmitting such motion with the desired differential effect in a manner already well known to the art.

Figure 2:
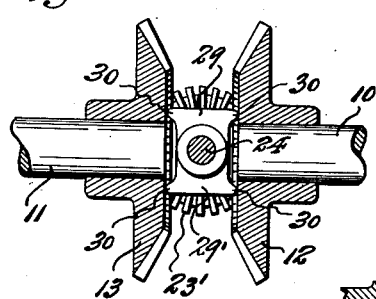
Fig. 2 is a fragmentary sectional view, taken on line 2—2 in Fig. 1.

Means is provided for locking the driven shafts 10 and 11 together against differential movement so that the same may be driven as a unit when there is tendency of either one or the other to rotate relative to the other at excess speed beyond the desired range of normal differential operation, as e. g., in automobile use of the mechanism, should a traction wheel driven by one said shaft lose traction and spin. One form and arrangement of means for this purpose, as shown in Figs. 1 and 2, comprises a control screw 24 which extends axially between the opposed planetary pinions 23 and 23'. Said control screw is fixed at one end to one of said pinions, e. g. the pinion 23, as by keys 25, so as to turn therewith, but said control screw is provided at its opposite end with a journal extension 26 which rotates freely in the opposite pinion 23', which thus serves as a bearing therefor. Threaded onto the control screw 24 is a floating lock piece or jamb nut member 27, which normally rides on the intermediate portion of said control screw 24. Said lock piece or jamb nut member 27 is provided, intermediate oppositely extending end portions 28 and 28' thereof, with laterally and oppositely extending guide arms 29 and 29', which are preferably provided adjacent their extremities with oppositely extending projections or cheeks 30 offset from the sides thereof, so that, by contact thereof with the opposed faces of the bevel gear wheels 12 and 13 the cheeks prevent the lock piece or jamb nut member 27 from rotating with the control screw 24 when the latter is turned.

In operation, the differential gear mechanism will perform in the usual manner when variations of relative speeds of the driven shafts 10 and 11 remain within the normal range of desired differential operation. For example, assuming said shafts 10 and 11 respectively drive the respective traction wheels of an automobile, relative changes of shaft speeds caused by movement of an outer wheel through a greater distance of travel than that traversed by the inner wheel, as occurs when the automobile traverses curves in the highway or turns corners, will be permitted by the differential action of the gearing. Since it has been observed with respect to the travel of an automobile over highways and streets that there is no great accumulation of either right or left hand turns in continuous sequence, and, in fact, occurrence of right and left turns are alternated to a sufficient extent that the occurrences of such turns tend substantially to balance each other, it is obvious therefore that rotary movements of the control screw 24 more or less alternately in opposite directions will cause the lock-piece or jamb nut member 27 to normally move back and forth or float upon the control screw without making prolonged contact with either pinion 23 or 23'. If contact of the lock-piece or jamb nut member 27 should momentarily occur during normal travel, it will not interfere with the propulsion of the automobile for the gearing will, for a brief period, merely rotate as a unit, until reverse rotary movement of the control screw, which is bound to occur, releases the lock piece or jamb nut for its normal floating movement above mentioned.

Assuming the control screw 24 to possess a right hand thread as shown, if one traction wheel, forwardly driven by the shaft 10, loses traction so as to spin, resulting in rotation of said shaft 10 and gear wheel 12 at an excessively accelerated speed relative to the speed of the shaft 11 and gear wheel 13, or so that rotation of the latter ceases, then the pinion 23 and control screw 24 will be rotated clockwise. Such rotation of the control screw causes the lock piece or jamb nut member 27 to travel upwardly along the control screw so as to jamb against the pinion 23, thus locking the latter against rotation, and thereby causing it to key the gear wheels 12 and 13 together, so that the same and the shafts 10 and 11 driven thereby turn as a unit, thus transmitting driving power equally to both traction wheels. If, on the other hand, the other traction wheel, forwardly driven by the shaft 11, loses traction so as to spin, then the pinion 23 and control screw 24 will be turned counterclockwise, thereby causing the lock piece or jamb nut member 27 to travel downwardly along the control screw, so as to jamb against the pinion 23' with like differential gear locking effect, so that the gearing and shafts 10 and 11, together with the traction wheels driven thereby, turn as a unit. In either case, slipping or spinning of an individual traction wheel is arrested, and driving traction of both wheels is assured so as to move the automobile, and thus overcome any stalled condition thereof due to spin or slip and consequent lost traction of one of said traction wheels.

When the differential gearing locks under traction wheel spinning circumstances resulting in a stalled condition of an automobile served thereby, as above stated, the locked condition of the differential gearing functions to transmit equal driving power to both traction wheels, which are operated through said gearing, with the result that the automobile is propelled away from the road surface condition which caused the spinning of one of said traction wheels. Thereafter, if the automobile is either driven ahead or backward, some weaving to right or left from a straight course occurs which, when in a direction which reverses rotation of the pinion 23, results in releasing the locking piece or jamb nut member 27, so that the latter resumes its normal floating condition on the control screw 24; that is, enough free play of said locking piece or jamb nut member is allowed to permit the differential gearing to function with normal differential effect.

Figure 3:
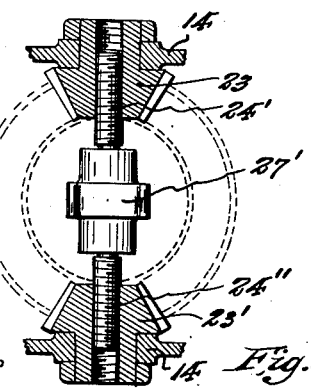
Fig. 3 is a fragmentary transverse sectional view of a modified form of the differential gearing according to the invention.

Referring to Fig. 3 of the drawings, I have shown therein a modified arrangement of the lock piece or jamb nut member and its control screw actuating means. In this modified arrangement, the locking piece or jamb nut member 27' is provided with oppositely extending control screw portions 24' and 24" which are unitary therewith. One said control screw portion, as 24', is provided with a right hand screw thread which is threaded into the pinion 23, and the other control screw portion, as 24" is provided with a left hand screw thread which is threaded into the pinion 23'. It will be obvious that, according to the direction of relative rotation of the pinions 23 and 23' in opposite directions, and in these directions according to which traction wheel spins, the locking piece or jamb nut member 27' will be moved into locking relation to one or the other of said pinions 23 and 23', as the case may be, thus temporarily locking the differential gearing so as to condition the same for rotation as a unit, and thus to simultaneously transmit driving power equally to both traction wheels. The locking and releasing operations of the thus modified arrangement and form of the locking piece or jamb nut member responds to the same conditions as already above set forth in connection with the first described embodiment of this invention.

Figure 4:
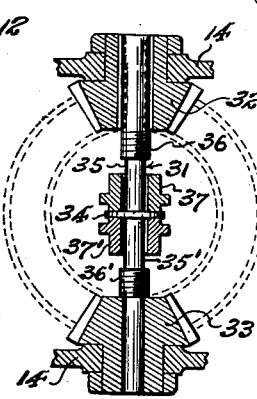
Fig. 4 is a fragmentary transverse sectional view, similar to that of Fig. 3, but showing another modified form of the differential gearing embodying the general principles of this invention.

Referring to Fig. 4 of the drawings, another modified embodiment of this invention is shown, wherein a shaft 31 is keyed to a pinion, e. g. the pinion 32, and its opposite end journaled in the opposite pinion 33. Said shaft 31 is provided with an annular enlargement or stop portion 34 on its medial part. The oppositely extending parts 35 and 35' of said shaft adjacent to said stop portion 34 are unthreaded. The shaft part 35 is provided, adjacent the pinion 32, with screw-threads 36, and the shaft part 35' is also provided, adjacent the pinion 35', with screw-threads 36'. Slidably mounted on the respective unthreaded parts 35 and 35' are respective internally screw-threaded locking pieces or jamb nuts 37 and 37'. When one gear wheel is rotated at excessive speed in forward direction, so as to rotate the pinion 32 and shaft 31 in clockwise direction, the locking piece or jamb nut 37 will be thrown by centrifugal force outwardly along the shaft part 35 so as to operatively engage the screw-threads 36, and thus be caused to move into locking contact with the pinion 32. On the other hand, when the other gear wheel is rotated at excessive speed in forward direction, so as to rotate the pinion and shaft counterclockwise, the locking piece or jamb nut 37' will be thrown by centrifugal force outwardly along the shaft part 35' so as to operatively engage the screw-threads 36', and thus be caused to move into locking contact with the opposite pinion 33. After either such locking action, the effected locking piece or jamb nut will be released by an ensuing rotation of the shaft in direction opposite to that by which its locking operation was effected.

Having now described my invention, I claim:

1. A differential gear system including axially aligned gear wheels, a driven frame rotatable about the axis of said gear wheels, aligned planetary pinions journaled in said frame between said gear wheels so as to intermesh therewith, a shaft keyed to one of said pinions so as to rotate therewith, said shaft having a screw-threaded portion adjacent said pinion, a floating locking piece on said shaft adapted under the urge of centrifugal force to engage the threaded portion of said shaft so as to be moved thereby toward and from locking engagement with said pinion.

2. A differential gear system including axially aligned gear wheels, a driven frame rotatable about the axis of said gear wheels, aligned planetary pinions journaled in said frame between said gear wheels so as to intermesh therewith, a screw-threaded shaft keyed to one of said pinions so as to rotate therewith, a locking piece adapted to make threaded connection with said shaft so as to be movable therealong when the shaft is rotated, and means cooperative with opposed faces of said gear wheels for holding said locking piece against rotation about the shaft, said shaft being operative to move said locking piece into locking relation to a pinion when one gear wheel rotates in one direction at excessive speed relative to the other gear wheel, and thereafter, when said gear wheel rotates in the opposite direction, to release said locking piece from such locking relation.

ALBERT W. MESICK.

REFERENCES CITED

The following references are of record in the file of this patent:

UNITED STATES PATENTS

| Number | Name | Date |
| --- | --- | --- |
| 657,057 | Blowstrom | Aug. 28, 1900 |
| 1,341,276 | MacDonald | May 25, 1920 |
| 1,431,535 | MacDonald | Oct. 10, 1922 |